C. P. Wing.
Table Leaf Support.
No. 91,397. Patented Jun. 15, 1869.

Witnesses.
Chas. Niela
O. Hinchman

Inventor,
Chas. P. Wing.
per Munn & Co.
Attys.

United States Patent Office.

CHARLES P. WING, OF LYONSVILLE, ILLINOIS.

Letters Patent No. 91,397, dated June 15, 1869.

IMPROVED TABLE-LEAF SUPPORT.

The Schedule referred to in these Letters Patent and making part of the same.

To all whom it may concern:

Be it known that I, CHARLES P. WING, of Lyonsville, in the county of Cook, and State of Illinois, have invented a new and improved Table-Leaf Support; and I do hereby declare that the following is a full, clear, and exact description thereof, which will enable others skilled in the art to make and use the same, reference being had to the accompanying drawing, forming part of this specification, in which—

Similar letters of reference indicate corresponding parts.

My invention has for its object to furnish a simple, convenient, and secure support for table-leaves, which shall be so constructed that it may be operated to secure or release the leaves without its being necessary to stoop and reach under the leaves to operate the support; and It consists in the combination of a pivoted and jointed brace-bar, and the catch and trip-cord, as hereinafter more fully described.

A represents the frame, B the top, and C the leaves of the table, about the construction of which parts there is nothing new.

Figure 1:
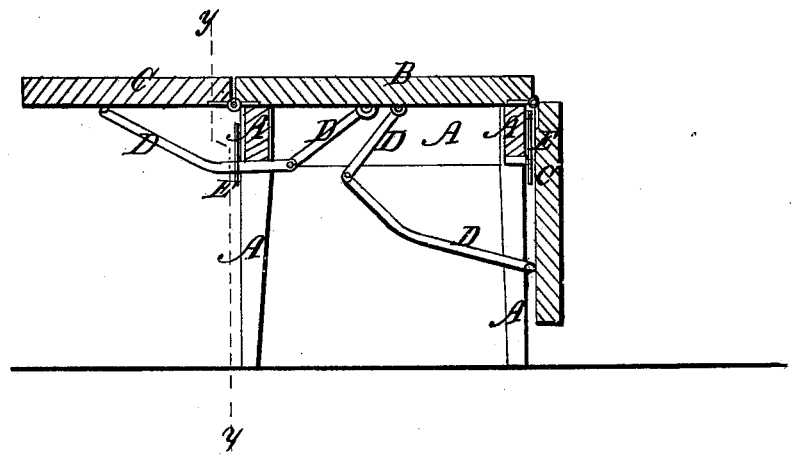
Figure 1 is a vertical cross-section of a table to which my improvement has been attached, taken through the line x–x, fig. 2.
Figure 2:
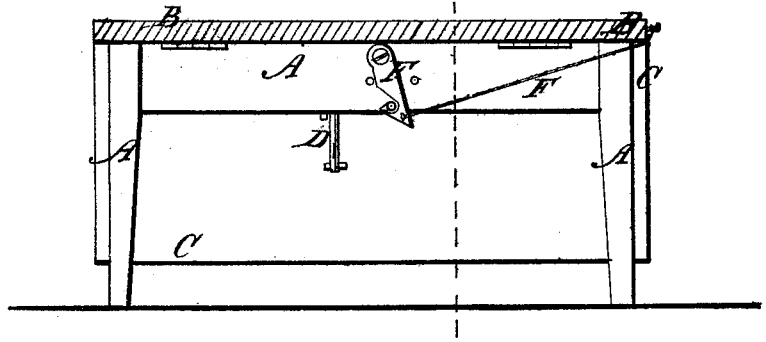
Figure 2 is a longitudinal section of the same, taken through the line y–y, fig. 1.

D is a jointed brace-bar, the end of the short arm of which is pivoted to the under side of the table-top B, and the end of the long arm of which is pivoted to the under side of the table-leaf C, as shown in fig. 1.

The long arm of the jointed brace D should be bent or curved to pass around the lower edge of the side bar of the frame A of the table.

E is a catch or hook, pivoted to the side bar of the frame A, and the movement or play of which may be limited by stop-pins attached to said bar.

The catch E should be weighted or made heavy, so that it may be held down by its own weight in such a position as to catch upon the long arm of the jointed brace D, when the table-leaf is raised, so as to hold the said leaf securely extended.

F is the trip-cord, one end of which is attached to the catch E, and its other end is attached to the top of the table, at or near its end edge, so that by a slight pull upon the cord F, the catch E may be withdrawn from the jointed brace D, allowing the leaf to be lowered.

Having thus described my invention,

What I claim as new, and desire to secure by Letters Patent, is—

The combination of the jointed brace-bar D with the catch E and cord F, substantially as and for the purpose set forth.

CHARLES P. WING.

Witnesses:
    GEO. B. BRUCE,
    ELDRIDGE S. ANDRUS.